US012559131B2

(12) United States Patent
Pfadler et al.

(10) Patent No.: US 12,559,131 B2
(45) Date of Patent: Feb. 24, 2026

(54) METHOD OF A CONTROL CENTER FOR OPERATING AN AUTOMATED VEHICLE AND AUTOMATED VEHICLE

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 292 days.

(21) Appl. No.: 18/264,865

(22) PCT Filed: Feb. 9, 2022

(86) PCT No.: PCT/EP2022/053167
§ 371 (c)(1),
(2) Date: Aug. 9, 2023

(87) PCT Pub. No.: WO2022/171700
PCT Pub. Date: Aug. 18, 2022

(65) Prior Publication Data
US 2024/0109556 A1 Apr. 4, 2024

(30) Foreign Application Priority Data

Feb. 9, 2021 (EP) ..................................... 21156136

(51) Int. Cl.
*B60W 60/00* (2020.01)
(52) U.S. Cl.
CPC ................................. *B60W 60/001* (2020.02)
(58) Field of Classification Search
CPC ................................................. B60W 60/001
See application file for complete search history.

(56) References Cited

U.S. PATENT DOCUMENTS 9,465,388 B1 10/2016 Fairfield et al.
10,258,534 B1 4/2019 Sills et al.
(Continued)

FOREIGN PATENT DOCUMENTS

DE 102018209274 A1 * 12/2019 ...... B60W 30/18163
DE 102019204943 A1 10/2020
(Continued)

OTHER PUBLICATIONS

Extended European Search Report; European Patent Application No. 21156136.0; Jul. 15, 2021.
(Continued)

*Primary Examiner* — Vivek D Koppikar
*Assistant Examiner* — Jeffrey R Chalhoub
(74) *Attorney, Agent, or Firm* — BARNES & THORNBURG LLP

(57) ABSTRACT

A method of a control center for operating an automated transportation vehicle and an automated transportation vehicle allowing operation by the control center. The method includes reception of a request message for driving assistance and information on a traffic scenario of the automated transportation vehicle; determination by the control center at least one command for a maneuver of the automated transportation vehicle based on the traffic scenario and determination of a validity information for the at least one command, wherein the at least one command and/or the validity information is determined based on a channel quality; and submission of the at least one command and the validity information to the automated transportation vehicle.

23 Claims, 3 Drawing Sheets

(56) References Cited

U.S. PATENT DOCUMENTS

| | | | | |
|---|---|---|---|---|
| 2016/0370801 A1* | 12/2016 | Fairfield | ............. | G05D 1/0038 |
| 2018/0293898 A1 | 10/2018 | Redmann et al. | | |
| 2020/0183416 A1 | 6/2020 | Cheng et al. | | |
| 2020/0192351 A1 | 6/2020 | Rastoll et al. | | |
| 2020/0371516 A1* | 11/2020 | Walossek | ............. | G05D 1/0027 |
| 2022/0075366 A1* | 3/2022 | Blank | ................ | B60W 60/001 |

FOREIGN PATENT DOCUMENTS

| | | | |
|---|---|---|---|
| EP | 3634017 A1 | 4/2020 |
| EP | 3772226 A1 | 2/2021 |
| SE | 1850043 A1 | 8/2019 |

OTHER PUBLICATIONS

International Search Report; International Patent Application No. PCT/EP2022/053167; May 31, 2022.

\* cited by examiner

METHOD OF A CONTROL CENTER FOR OPERATING AN AUTOMATED VEHICLE AND AUTOMATED VEHICLE

PRIORITY CLAIM

This patent application is a U.S. National Phase of International Patent Application No. PCT/EP2022/053167, filed 9 Feb. 2022, which claims priority to European Patent Application No. 21156136.0, filed 9 Feb. 2021, the disclosures of which are incorporated herein by reference in their entireties.

SUMMARY

Illustrative embodiments relate to a method of a control center for operating an automated transportation vehicle and to an automated transportation vehicle that is configured to allow an operating by the control center by using the disclosed method.

BRIEF DESCRIPTION OF THE DRAWINGS

Disclosed embodiments will be explained in more detail below with reference to the drawings, in which.

DETAILED DESCRIPTION

Figure 1:
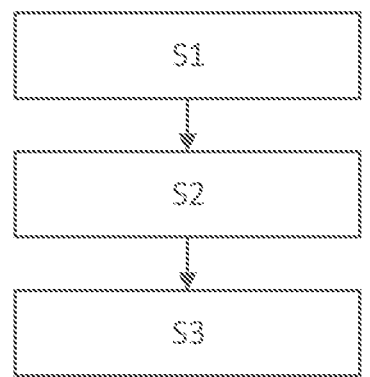
FIG. 1 illustrates a method of a control center for operating an automated transportation vehicle according to an exemplary embodiment.

Prior art defines an automated transportation vehicle, also known as an AV, an autonomous vehicle, a self-driving car, a driverless car, a robo-car, or a robotic car, which is a transportation vehicle that is capable of sensing its environment and moving safely with little or no human input.

Automated transportation vehicles combine a variety of sensors to perceive their surroundings, such as radar, lidar, sonar, GPS, odometry and inertial measurement units. Advanced control systems interpret information obtained from sensors to identify appropriate navigation paths, as well as obstacles and relevant signage.

Further, automotive applications and mobile communications become more and more entangled, particularly due to the increasing interest in automatic driving that requires larger amounts of data when compared to conventional driving. These data amounts are provided partially by the transportation vehicle itself (i.e., by sensors thereof) and partially via an air interface. Via the air interface such as a vehicle to vehicle, V2V, communication or a vehicle to infrastructure, V2I, communication or a vehicle to everything, V2X, communication is carried out, the latter including communication with road side units, RSUs.

Autonomous driving applications greatly benefit from V2X communications. In the case of tele-operated driving, ToD, V2X allows a control center, CC, to remotely support an automated transportation vehicle. Different kinds of supports exist. One distinguishes between: direct control, indirect control or remote support. In case of direct control, the automated transportation vehicle is completely operated by the control center, which is, for example, providing direct steering, acceleration and braking commands to the transportation vehicle. In case of indirect control or remote support, more responsibility is moved to the automated transportation vehicle. This means that the automated transportation vehicle is supported by the CC but is mostly responsible for its decisions.

It is known from prior art that in cases of indirect control or remote support, tele-operated driving, ToD, operations are used in situations which cannot be safely handled by an automated transportation vehicle automatically, to enable the automated transportation vehicle to solve the traffic/road situation. Those ToD operations include that the automated transportation vehicle gets support from the control center, such as an indication or high level command, on which it makes decisions independently afterwards. For instance, these indications could be traffic light recognition, object identification, permission to use different lanes or the side walk, crossing railroad tracks or perception issues due to bad weather conditions.

Document U.S. Pat. No. 9,465,388 B1, for example, discloses methods and apparatuses that enable an automated transportation vehicle to request assistance from a remote operator when the transportation vehicle's confidence in operation is low. The document discloses that during the operation of the autonomous vehicle, the transportation vehicle identifies a situation where confidence in operation falls below a predetermined threshold. The transportation vehicle then sends a request for assistance to a remote assistor. However, the document does not take into account what may happen in case of communication problems between an automated transportation vehicle and a control center.

If the communication between the control center and the automated transportation vehicle becomes unreliable, more responsibility is moved to the remotely controlled automated vehicle. For example, document DE 10 2019 204943 A1 describes a method of setting the operation mode of the AV based on the PQoS and the environment of the AV. In cases where the predicted quality of service, PQoS, of the communication, for example, indicates a low quality, the command center will not use direct control but will support the automated transportation vehicle in terms of indirect control or by simple support comments. This means that the AV gets support from the CC, such as an indication or high level command. Document US 2020/183416 A1, for example, describes the communication between a control center and an AV using a 5G network. Document EP 3 634 017 A1 further describes a method for determining which support comments for the AV are possible based on the PQoS. In document US 2020/371516 A1, the AV is to be controlled by an operator. For this purpose, the best operator is selected, among other things also based on the channel quality.

Support comments however may arrive with high delays at the automated transportation vehicle due to the unreliable communication. Document EP 3 772 226 A1 therefore proposes a method in which a possible delay is already included during the calculation of control information for the AV in the control center, so that they allow compensation of the delay by the AV. But even those control information may not be valid anymore when received by the AV. Performing such an invalid command would severely compromise the safety of the automated transportation vehicle's passengers.

Disclosed embodiments overcome or reduce at least some of the drawbacks of the prior art and to provide a method of a control center for safely operating an automated transportation vehicle, including the case of unreliable communication.

A first disclosed embodiment refers to a method of a control center for operating an automated transportation vehicle, optionally for operating an automated transportation vehicle in case of unreliable communication between the control center and the automated transportation vehicle.

The method comprises as a first operation a receiving of a request message from the automated transportation vehicle. The request message may comprise a request for driving assistance and information on a traffic scenario of the automated transportation vehicle. The information on the traffic scenario may contain data obtained from the automated transportation vehicle by sensors and describing the traffic scenario in which the automated transportation vehicle requires assistance. The data may be obtained by at least one on-board sensor of the automated transportation vehicle. The data may be obtained by at least one sensor configured for acquiring ambient data. Such a sensor may be a radar, lidar, sonar, GPS, odometry, inertial and/or camera sensor. The data may further be obtained by at least one sensor configured for acquiring transportation vehicle data. Additionally, the request message contains suggestions for maneuvers that could be performed in the traffic scenario by the automated transportation vehicle. The suggestions are optionally determined by the automated transportation vehicle.

In a further operation of the method, the control center determines at least one command for a maneuver of the automated transportation vehicle based on the traffic scenario. A maneuver according to this disclosure may be a movement or a series of movements the automated transportation vehicle may perform in the traffic scenario. A command according to this disclosure may be a control signal, which causes the automated transportation vehicle to perform a specific maneuver. The at least one command may be determined based on a channel quality. The channel quality optionally relates to at least one parameter that measures the quality of service of the communication between the control center and the automated transportation vehicle. Further the control center determines in this operation of the method a validity information for the at least one command. The validity information relates to a time of feasibility of the at least one command. Optionally, the control center determines a validity information for each of the at least one command. The validity information may be determined based on the channel quality. The at least one command is further determined based on the suggestion received from the transportation vehicle.

The method according to this disclosure further comprises the operation of submitting the at least one command and the validity information to the automated transportation vehicle.

The disclosed method ensures that the channel quality between the control center and the automated transportation vehicle is not disregarded during the operation of an automated transportation vehicle by a control center. This guarantees that no invalid commands are sent to the automated transportation vehicle even under unreliable communication conditions. It is particularly beneficial that no commands are sent that would become invalid during delayed transmission to the automated transportation vehicle. This significantly improves the safety of the operation of the automated transportation vehicle.

In a disclosed embodiment of the method of the present disclosure, the validity information specifies a time length and/or a time point. Optionally, the validity information specifies a time length in which the at least one command has to be executed, in other words, a time length in which the maneuver of the at least one command has to be started. The validity information specifies a time point until which the at least one command has to be executed, in other words, a time point until which the maneuver of the at least one command has to be started.

In a further disclosed embodiment of the method of the present disclosure, the channel quality relates to a latency of a transmission of the request message, hereinafter referred to as uplink latency, or to a latency of a transmission of the at least one command, hereinafter referred to as downlink latency. Optionally, the channel quality relates to the uplink latency and the downlink latency. The control center may be configured for determining the channel quality. The control center may be configured to calculate the uplink latency based on a timestamp. The timestamp may be contained in the request message and indicates the time at which the request message was sent. The downlink latency may be predicted by the control center. The downlink latency may be predicted by the control center based on the uplink latency.

In another exemplary embodiment of the method of the present disclosure, the channel quality relates to an error bit rate, BER, or a signal to interference plus noise ratio, SNR, or a predicted quality of service, PQOS. In such disclosed embodiment, the control center may determine at least one command that can be fully transmitted to the automated transportation vehicle within a predetermined time. In other words, if the communication between the control center and the automated transportation vehicle becomes unreliable, e.g., in cases where the predicted quality of service, PQoS, of the communication indicates a low quality, the command center will not use commands for complicated or extended maneuvers but will rather support short command for easy maneuvers or short commands triggering predefined maneuver routines in the automated transportation vehicle. In other words, by considering the channel quality when determining the command, the amount of responsibility laid upon the automated transportation vehicle can be adaptively adjusted.

In a further exemplary embodiment, the channel quality is related to a specific area and/or time. After determining it, the control center may be configured to link the channel quality with the specific area and/or time. The control center may be configured to store the channel quality with the linked area and/or time. Optionally, the control center is configured for determining the channel quality based on an area and/or time, optionally based on a stored area and/or time. The control center can thus store channel quality information related to specific areas and/or times and can use such information for subsequent driving assistance.

According to a further disclosed embodiment of the present disclosure, the communication between the control center and the automated transportation vehicle is carried out via a mobile communication network. Optionally, the communication is carried out in a 3G, 4G or 5G network with sidelink carries at the PHY layer (PC5 sidelink) or based on WLAN communication according to IEEE 802.11p standard.

In a further exemplary embodiment of the present disclosure, channel quality information is received from at least one server of the mobile communication network. The channel quality information may be a data structure containing data that relates to at least one parameter that measures the quality of service of the mobile communication network. The channel quality information may be related to a specific area and/or time. Optionally, the channel quality information is received by the control center or the automated transportation vehicle. The control center and the automated transportation vehicle may be configured to determine the channel quality, e.g., a downlink and/or uplink latency, based on the channel quality information.

According to a further disclosed embodiment of the present disclosure, the channel quality information is received periodically or as a single notification from the at least one server. Optionally, the channel quality information is received as a single notification based on a request, that is send to the at least one server. The channel quality information may be received periodically or as notifications in case of specified conditions, wherein the receiving is based on a subscription send to the at least one server. A specified condition optionally occurs, if a change in the at least one parameter exceeds a predetermined threshold.

According to another exemplary embodiment of the method of the present disclosure, the validity information for each command is determined as a difference of a time window for the maneuver of the command and a duration of the maneuver. According to this disclosure, the time window optionally relates to a time span in which the maneuver has to be completed. The time window may be based on the traffic scenario and sets a temporal boundary condition on the performance of the maneuver, e.g., to fulfil safety requirements. In other words, the time window relates to the time span in which the automated transportation vehicle, being in the traffic scenario, has to perform the maneuver completely, optionally to satisfy a predefined safety criteria. The duration of the maneuver, according to this disclosure may be the amount of time it takes for the maneuver to be completely performed by the automated transportation vehicle. Hence, the duration refers to the time length of the maneuver.

In a further disclosed embodiment, the validity information for each command is determined as a difference of the time window of the maneuver of the command and a total of the duration of the maneuver and the latency. The latency may be the uplink latency or the downlink latency. The latency may be a combination of the uplink latency and the downlink latency. The validity information may contain an indication whether the uplink latency or the downlink latency or both were included in the determination of the validity information.

According to an exemplary embodiment of the method of the present disclosure, the operation of determining at least one command comprises the operation of determining a set of commands based on the traffic scenario and determining the duration of the maneuver of every command in the set of commands. Further the determining of the at least one command comprises the operation of determining, for every maneuver, the time window based on the traffic scenario. The control center determines the time window for every maneuver additionally based on traffic information. The traffic information may include information on rail vehicles, traffic lights, congestion, pollution or damage to the road, construction sites and/or obstacles. As a further operation, the determining of the at least one command comprises selecting at least one command from the set of commands for which the validity information exceeds a predetermined threshold. The validity information for each command may be determined by the control center based on the time window and the duration of the maneuver of the command. The validity information for each command may be determined based on the time window of the maneuver of the command, the duration of the maneuver and the latency. The predetermined threshold may be below 5 s, optionally below 3 s or optionally below 1 s.

According to another exemplary embodiment of the method of the present disclosure, the operation of determining at least one command comprises the operation of determining a set of commands based on the traffic scenario and determining a bit number of the each of the set of commands. As a further operation, the determining of the at least one command comprises determining a channel quality related to a bit error rate, a signal to interference plus noise ratio or a predicted quality of service and selecting at least one command from the set of commands based on the determined bit number and the determined channel quality. Therein, based on such determination a reliable transmission of the command in readable form to the automated transportation vehicle shall be ensured and the necessity of retransmission shall be minimized. Hence, the determined command is less likely to be executed within a shorter time span, hence increasing safety.

In a further disclosed embodiment, selecting the at least one command further comprises selecting one of the at least one command that is providing the highest safety margin. Optionally, the safety margin is based on the validity information. Exemplarily, when the validity information specifies a time of feasibility for a command, the command with the largest time of feasibility is providing the highest safety margin. The safety margin may also be based on fuel economy, low acceleration and/or low risk of damage related to the command, e.g., takes into account further weighing factors next to the validity information.

In a further disclosed embodiment, the present disclosure relates to a control center for operating an automated transportation vehicle comprising a communication unit configured for a communication with the automated transportation vehicle and a control unit configured to execute all operations of the above described method of a control center.

Another exemplary embodiment relates to an automated transportation vehicle, in particular, an automated passenger car with internal combustion engine, electric motor or hybrid engine, comprising at least one first sensor configured for acquiring ambient data, at least one second sensor configured for acquiring vehicle data, a communication module configured for a communication with a control center, and a controller.

According to the present disclosure, the at least one first sensor is configured to detect sensor signals relating to the environment of the transportation vehicle. Optionally, the at least one first sensor is a radar, lidar, sonar, GPS, odometry, inertial and/or camera sensor. The at least one second sensor may be configured to detect sensor signals relating to the transportation vehicle itself, such as e.g., a fuel level, a battery level, a number of occupants, and/or a velocity of the transportation vehicle. The communication module is configured to receive and send information directly or indirectly via vehicle-to-vehicle, V2V, communication, vehicle to everything, V2X, communication or optionally via vehicle to infrastructure, V2I, communication.

The controller may be configured for determining a traffic scenario based on data received by the at least one first sensor and by the at least one second sensor. The controller may be configured for partially or fully automated longitudinal and/or lateral guidance of the automated transportation vehicle based on the traffic scenario and/or based on at least one command.

The controller may be configured to detect a situation that requires assistance from the control center based on the traffic scenario. The controller may be configured for, if it detected a situation that requires assistance, sending a request message comprising a request for driving assistance and information on the traffic scenario to the control center via the communication module. The controller may be configured for receiving at least one command and a validity information for the at least one command from the control center via the communication module. Further the controller may be configured for determining a feasibility of the at least one command based on the validity information, selecting one of the at least one command based on the feasibility and performing the selected command. The validity information may be determined based on a channel quality, particularly based on a channel quality of a communication channel between transportation vehicle and control center. The validity information may comprise information related to such channel quality.

In a disclosed embodiment of the automated transportation vehicle, the controller is further configured for determining a time of feasibility from the validity information. Optionally, the validity information contains an indication whether the uplink latency or the downlink latency or both were included in the determination of the validity information. The controller may be configured to detect from the indication whether one or both latencies were included in the determination of the validity information. If both latencies were included, the controller may be configured to determine the time of feasibility as the time contained in the validity information. The controller in this disclosed embodiment is further configured for selecting the one command with the largest time of feasibility from the at least one command. The controller may be configured for discarding any command with the time of feasibility being below a predetermined threshold. The predetermined threshold is optionally below 5 s, optionally below 3 s or optionally below 1 s.

In a disclosed embodiment of the automated transportation vehicle, the controller is further configured for determining a latency of the communication with the control center. The automated transportation vehicle may be configured to calculate the downlink latency based on a timestamp. The timestamp may be contained in the received command and indicates the time at which the command was sent. The uplink latency may be estimated by the automated transportation vehicle based on the downlink latency. The uplink and/or downlink latency may be determined by the automated transportation vehicle based on the channel quality information received from at least one server of the mobile communication network. The transportation vehicle thus considers channel quality during an assisted driving operation.

In this exemplary embodiment, the controller is further configured for determining the time of feasibility based on the validity information and the determined latency. Optionally, the validity information contains an indication whether the uplink latency or the downlink latency or both were included in the determination of the validity information. The controller may be configured to detect from the indication whether a latency was not included in the determination of the validity information. If a latency was not included, the controller may be configured to determine the time of feasibility as the difference of the time contained in the validity information and the latency that was not included. The controller in this disclosed embodiment is further configured for selecting the one command with the largest time of feasibility from the at least one command. The controller may be configured for discarding any command with the time of feasibility being below a predetermined threshold. The predetermined threshold is optionally below 5 s, optionally below 3 s or optionally below 1 s.

According to a further exemplary embodiment of the automated transportation vehicle, the controller is further configured for sending a new request message to the control center if the feasibility of each of the at least one command is insufficient. In other words, if each of the at least one command was discarded for having a time of feasibility below the predetermined threshold, the controller is configured for sending the new request message to the control center. The controller may be sending the new request message instead of selecting one command of the at least one command and performing the one command. In other words, the controller is restarting the method if each of the at least one command is found to be insufficient.

The different embodiments described herein may be combined unless the contrary is indicated herein.

Some portions of the detailed description which follows are presented in terms of data processing procedures, operations or other symbolic representations of operations on data bits that can be performed on computer memory. Therefore, a computer executes such logical operations thus requiring physical manipulations of physical quantities.

Usually these quantities are electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

As utilized herein, the term "example" means serving as a non-limiting example, instance, or illustration. As utilized herein, the terms "for example" and "e.g." introduce a list of one or more non-limiting examples, instances, or illustrations.

As used herein, the term "and/or" includes any and all combinations of one or more of the associated listed items. Further, the use of "may" when describing embodiments refers to "one or more embodiments." Further, in the following description of embodiments, the terms of a singular form may include plural forms unless the presented context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items and expressions such as "at least one of" when preceding a list of elements, modify the entire list of elements.

Reference will now be made in detail to embodiments which are illustrated in the drawings. Effects and features of the exemplary embodiments will be described with reference to the accompanying drawings. Therein, like reference numerals denote like elements, and redundant descriptions are omitted. The present disclosure, however, may be embodied in various different forms, and should not be construed as being limited to only the illustrated embodiments herein. Rather, these embodiments are provided solely as examples for fully conveying the facets and features of the present disclosure to those skilled in the art.

FIG. 1 illustrates a method of a control center for operating an automated transportation vehicle according to a first disclosed embodiment. In a first operation at S1 of the method, the control center receives a request message from the automated transportation vehicle. The request message comprises a request for driving assistance and information on a traffic scenario of the automated transportation vehicle.

The control center determines in a second operation at S2 of the method at least one command based on the traffic scenario received in the first operation at S1, wherein each of the one or more commands is for a maneuver of the automated transportation vehicle. Further the control center determines a validity information for each command in the second operation at S2. Thereby at least one command and/or the validity information is determined based on a channel quality.

In a third operation at S3 of the method, the control center submits the at least one command and the validity information as determined in the second operation at S2 to the automated transportation vehicle.

Figure 2:
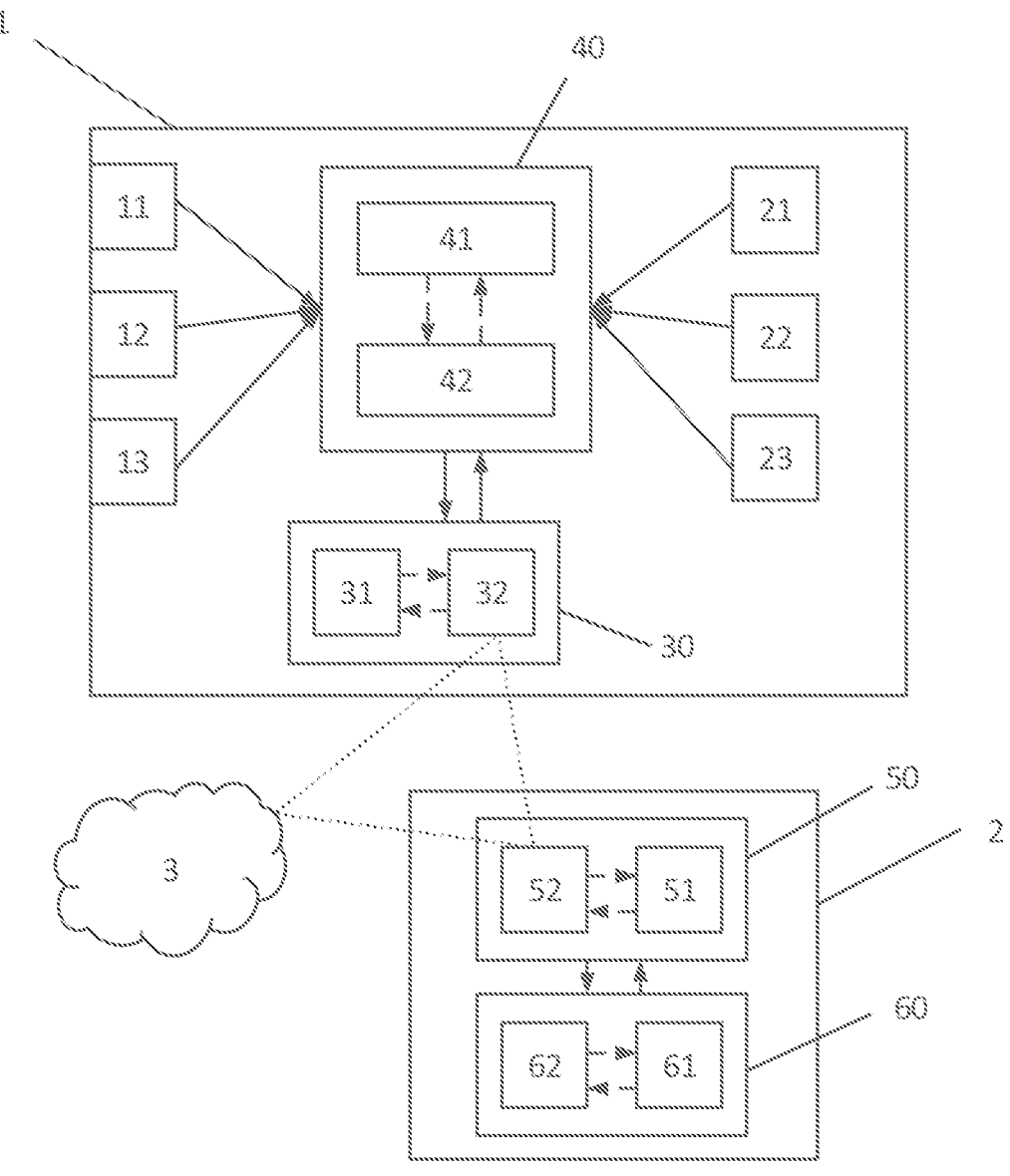
FIG. 2 illustrates an automated transportation vehicle, a control center and a mobile communication network according to exemplary embodiments.

FIG. 2 illustrates an automated transportation vehicle 1, in particular, an automated passenger vehicle with an internal combustion engine, an electric engine, or a hybrid engine, a control center 2 and a mobile communication network 3 according to disclosed embodiments.

The automated transportation vehicle 1 comprises a plurality of first sensors, in particular, a first sensor 11, a second sensor 12, and a third sensor 13. The first sensors 11, 12, 13 are arranged for detecting ambient data of the transportation vehicle 1 and comprise, for example, a camera for detecting an image of a roadway and/or roadway boundaries located in front of the automated transportation vehicle 1, distance sensors, such as ultrasonic sensors, for detecting distances to objects surrounding the automated transportation vehicle 1, such as roadway boundaries, such as walls or guard rails. The first sensors 11, 12, 13 transmit the ambient data they detect to a controller 40 of the automated transportation vehicle 1.

The automated transportation vehicle 1 further comprises a plurality of second sensors, in particular, a fourth sensor 21, a fifth sensor 22, and a sixth sensor 23. The second sensors 21, 22, 23 are sensors for determining vehicle data relating to the automated transportation vehicle 1 itself, in particular, current position and movement information of the automated transportation vehicle 1. Consequently, the second sensors are, for example, speed sensors, acceleration sensors, inclination sensors or the like. The second sensors 21, 22, 23 transmit the status data detected by them to the controller 40 of the automated transportation vehicle 1.

The controller 40 is configured for determining a traffic scenario based on the data received by first sensors 11, 12, 13 and by the second sensors 21, 22, 23. The controller may be configured for partially or fully automated longitudinal and lateral guidance of the automated transportation vehicle 1 based on the traffic scenario.

Further the disclosed controller 40 is configured to carry out the disclosed methods, as explained in detail below. For this purpose, the controller 40 has an internal memory 41 and a CPU 42, which communicate with one another, for example, via a suitable data bus. Furthermore, the controller 40 is in communication connection with at least the first sensors 11, 12, 13, the second sensors 21, 22, 23 and a communication module 30, for example, via one or more respective CAN connections, one or more respective SPI connections or other suitable data connections.

The communication module 30 comprises a memory 31 and one or more transponders or transceivers 32. The transceiver 32 is a radio, WLAN, GPS or BLUETOOTH® transceiver or the like, in particular, a transceiver configured for communication in a communication network. The transceiver 32 communicates with the internal memory 31 of the communication module 30, for example, via a suitable data bus. The communication module 30 also communicates with the control unit 40, in particular, transmitting data received therefrom and/or receiving data to be sent therefrom. Furthermore, the communication module 30 is adapted to communicate with a communication unit 50 of a control center 2 via V2I communication, optionally via a communication network 3. Furthermore, the communication module 30 may also be arranged to communicate with one or more servers of the communication network 3.

The communication network 3 may be a network according to 3GPP standard, for example, an LTE, LTE-A (4G) or 5G communication network. The communication network may further be configured for the following operations or according to the following standards: High Speed Packet Access (HSPA), a Universal Mobile Telecommunication System (UMTS), UMTS Terrestrial Radio Access Network (UTRAN), evolved-UTRAN (e-UTRAN), Global System for Mobile communication (GSM), Enhanced Data rates for GSM Evolution (EDGE), GSM/EDGE Radio Access Network (GERAN). Alternatively or additionally, the communication network can also be designed according to one of the following standards: Worldwide Inter-operability for Microwave Access (WIMAX) network IEEE 802.16, Wireless Local Area Network (WLAN) IEEE 802.11. Also, the communication network may use one of the following coding schemes: Orthogonal Frequency Division Multiple Access (OFDMA), Time Division Multiple Access (TDMA), Code Division Multiple Access (CDMA), a Wideband CDMA (WCDMA), Frequency Division Multiple Access (FDMA), or Spatial Division Multiple Access (SDMA), etc.

The communication unit 50 of the control center 2 comprises a memory 51 and one or more transponders or transceivers 52. The transceiver 52 is a radio, WLAN, GPS or BLUETOOTH® transceiver or the like, in particular, a transceiver configured for communication in a communication network. The transceiver 52 communicates with the internal memory 51 of the communication unit 50, for example, via a suitable data bus. The communication unit 50 also communicates with a control unit 60 of the control center 2, for example, via one or more respective CAN connections, one or more respective SPI connections or other suitable data connections, in particular, transmitting data received therefrom and/or receiving data to be sent therefrom.

The disclosed control unit 60 is configured to carry out the disclosed methods, as explained in detail below. For this purpose, the controller 60 has an internal memory 61 and a CPU 62, which communicate with one another, for example, via a suitable data bus.

Figure 3:
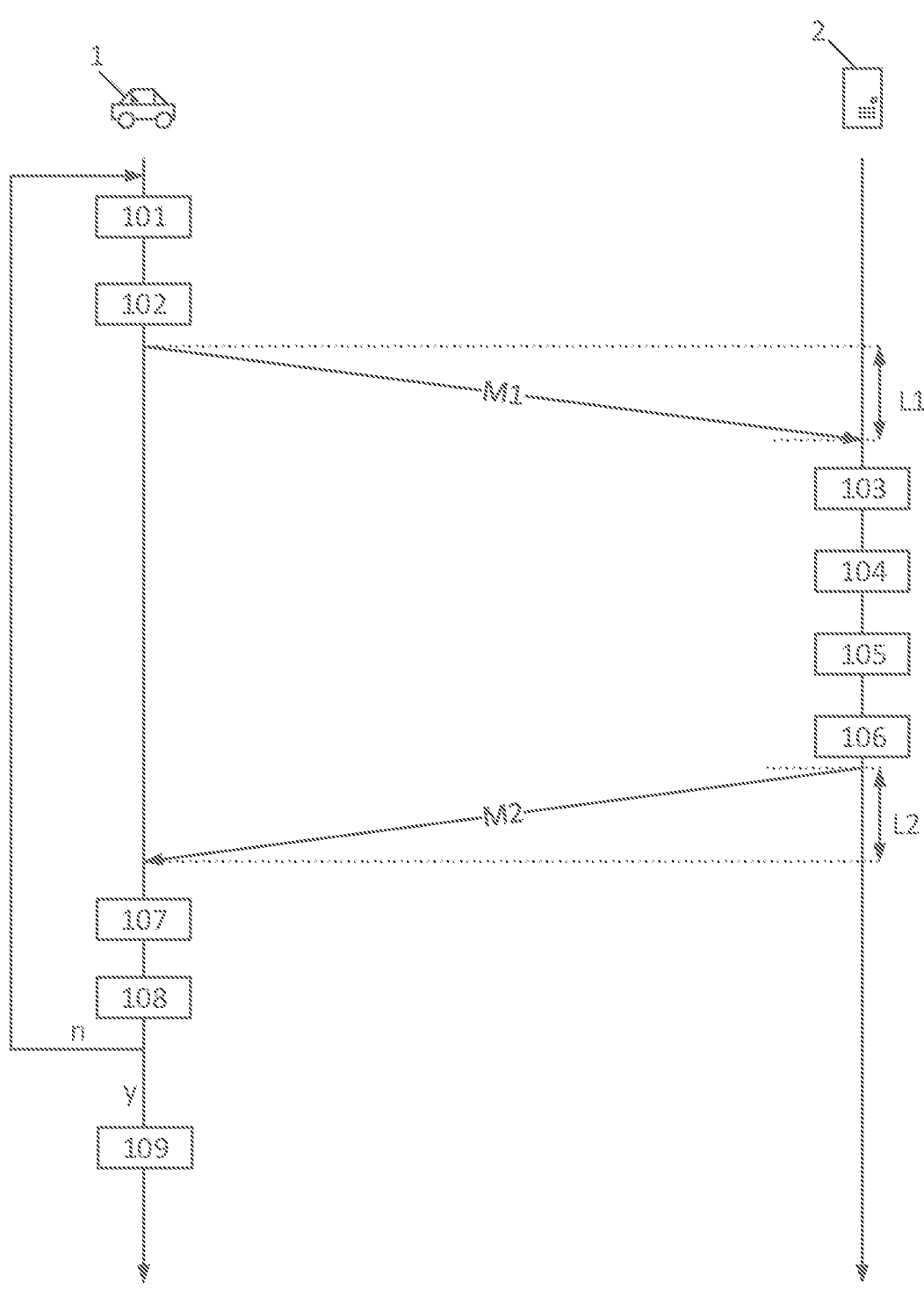
FIG. 3 illustrates an exemplary use of the disclosed method according to an exemplary embodiment with a control center and an automated transportation vehicle.

FIG. 3 illustrates an exemplary use case of the disclosed methods according to exemplary embodiments with a control center 2 and an automated transportation vehicle 1. In particular, in this exemplary situation, a strong variation in the communication quality between the control center 2 and the automated transportation vehicle 1 was detected, which is why a switch was made from direct control to remote support of the automated transportation vehicle 1 by the control center 2. This means that the automated transportation vehicle 1 is supported by the control center 2 but is mostly responsible for its decisions.

In a first operation at 101, the automated transportation vehicle 1 determines a traffic scenario based on data received by the first sensors 11, 12, 13 and by the second sensors 21, 22, 23. In a second operation at 102, a deadlock situation is determined by the automated transportation vehicle 1 based on the traffic scenario, in particular, a situation, that requires assistance from the control center 2. In this exemplary situation, the automated transportation vehicle 1 is standing in front of an unrestricted railroad crossing. Since it cannot independently recognize whether it is safe to cross the railroad crossing, it requests assistance from the control center 2, by sending a request message M1 comprising a request for driving assistance and information on the traffic scenario to the control center 2.

After receiving the request message M1, the control center 2, in a third operation at 103, determines a set of commands based on the traffic scenario, every command relating to a control signal, which causes the automated transportation vehicle 1 to perform a specific maneuver. Each of the commands' maneuvers in this exemplary case have the goal of moving the automated transportation vehicle 1 to the other side of the railroad crossing. An example of a maneuver would be to have the transportation vehicle move forward at a certain speed until it clears the railroad crossing. In the third operation, the control center 2 further determines the duration of the maneuver of every command in the set of commands, the duration being the time required by the automated transportation vehicle 1 to complete the maneuver.

In a forth operation at 104, the control center 2 determines, for every maneuver, the time window based on the traffic scenario and on traffic information. In this exemplary case, the control center 2 requests information about the rail traffic and determines based on this that a train will cross the railroad crossing in 20 s. The time window, which is, in particular, the time span in which a maneuver can be safely executed completely, is therefore 20 s for every maneuver.

In a fifth operation at 105, the control center 2 determines based on the duration and time window for every maneuver the validity information. The validity information for each command is in this case determined as a difference of the time window for the maneuver of the command and the duration of the maneuver. For an exemplary maneuver, where the transportation vehicle crosses the railroad crossing at a speed of 10 km/h and needs 12 s to do so, the validity information is therefore calculated with 20 s minus 12 s as 8 s. Neither the latency L1 of the request message M1, i.e., the uplink latency L1, nor the latency L2 of the message M2 with which the command is sent to the automated transportation vehicle 1, i.e., the downlink latency L2, was taken into account in this case. The validity information for the exemplary maneuver thus consists of the determined time span of 8 s and of an indication that none of the latencies has been included in the determination of the validity information.

Further the control center 2 selects in a sixth operation at 106 at least one command, for which the validity information exceeds a predetermined threshold. The predetermined threshold was chosen in this example as 5 s. The command for the exemplary maneuver is thus selected by the control center 2, since the validity information of 8 s exceeds the predetermined threshold of 5 s.

In a second message M2 the command for the exemplary maneuver together with other selected commands and with the validity information to each command is send to the automated transportation vehicle 1 by the control center 2.

After receiving the second message M2, the automated transportation vehicle 1 determines, in a seventh operation at 107, the uplink latency L1 and the downlink latency L2, because it has concluded from the validity informations received that those have not yet been included in the determination. In this exemplary case, the automated transportation vehicle 1 first calculates the downlink latency L2 based on a timestamp of the second message M2, which indicates the time at which the second message M2 was sent. Then the automated transportation vehicle 1 estimates the uplink latency L1 based on the downlink latency L2. In this exemplary case, the automated transportation vehicle 1 determines both the downlink latency L2 and the uplink latency L1 as 1 s.

In an eighth operation at 108, the automated transportation vehicle 1 determines the time of feasibility for every command as the difference of the time contained in the related validity information and the latency that was not included. The time of feasibility for the command of the exemplary maneuver is thus determined from the validity information of 8 s minus the uplink latency of 1 s and minus the downlink latency of 1 s as 6 s. The automated transportation vehicle 1 then selects the one command with the largest time of feasibility from the one or more commands that were sent by the control center 2. In this exemplary case, the command for the exemplary maneuver is selected.

The automated transportation vehicle 1 is configured for discarding any command with the time of feasibility being below a predetermined threshold, which may be the same or a different predetermined threshold as used by the control center 2. In this exemplary case, the predetermined threshold was chosen as 3 s. Since the time of feasibility of the selected command exceeds this predetermined threshold (6 s>3 s), the method follows the path marked y in FIG. 3 and the ninth operation at 109 is executed by the automated transportation vehicle 1. The ninth operation at 109 consists of performing the selected command.

In another example, where the downlink latency is 5 s due to a communication failure, the time of feasibility of the selected command is calculated to be 8 s minus 1 s minus 5 s as 2 s. The time of feasibility is now below the predetermined threshold, which is why the method follows the path marked with n in FIG. 3 and starts again from the beginning.

Figure 4:
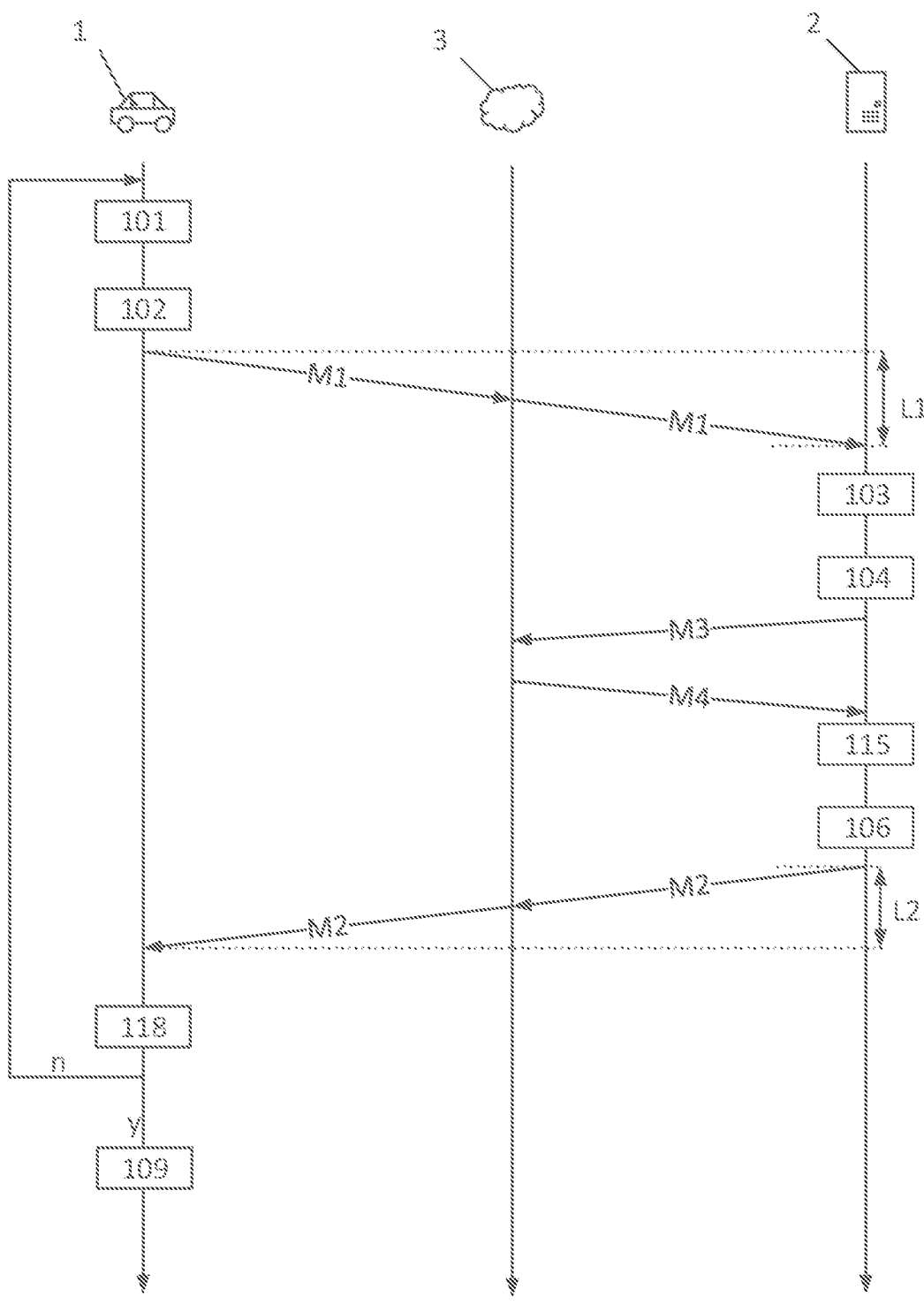
FIG. 4 illustrates another exemplary use of the disclosed method according to an exemplary embodiment with a control center and an automated transportation vehicle in a mobile communication network.

FIG. 4 illustrates another exemplary use case of the disclosed method according to an exemplary embodiment with a control center 2 and an automated transportation vehicle 1 in a mobile communication network 3. The beginning of the method until the forth operation at 104 is the same as described above for FIG. 3.

After determining the time window for every maneuver in the forth operation at 104 in this further exemplary case, the control center 2 requests channel quality information from the mobile communication network 3 by sending a third message M3 to at least one server of the mobile communication network 3. The control center 2 then receives a forth message M4 from the at least one server that contains the requested channel quality information. The control center 2 now determines the uplink latency L1 and the downlink latency L2 for the communication between the control center 2 and the automated transportation vehicle 1 based on the channel quality information. For example, the control center 2 determines the uplink latency L1 as 1 s and the downlink latency L2 as 1 s.

In a further operation at 115, the control center 2 then determines the validity information for each command as a difference of the time window of the maneuver of the command and a total of the duration of the maneuver and the latency. For the exemplary maneuver, where the transportation vehicle crosses the railroad crossing at a speed of 10 km/h and needs 12 s to do so, the validity information is therefore calculated with 20 s minus 12 s minus 1 s minus 1 s as 6 s. Both the uplink latency L1 and the downlink latency L2 were taken into account while determining the validity information in this case. The validity information for the exemplary maneuver thus consists of the determined time span of 6 s and of an indication that both of the latencies have been included in the determination of the validity information.

As described above for FIG. 3, the control center 2 selects in the sixth operation at 106 at least one command for which the validity information exceeds the predetermined threshold, exemplarily chosen as 5 s. The command for the exemplary maneuver is thus still selected in this further exemplary case and then send to the automated transportation vehicle 1 with the second message M2.

After receiving the second message M2, the automated transportation vehicle 1 concludes from the validity informations received that the latencies L1, L2 have been included in the determination. Therefore, the automated transportation vehicle 1 directly executes the further operation at 118, in which the time of feasibility of each command is determined as the time contained in the related validity information. The time of feasibility of the exemplary maneuver corresponds in this case to 6 s. The automated transportation vehicle 1 then selects the one command with the largest time of feasibility from the one or more commands that were sent by the control center 2. In this further exemplary case, the command for the exemplary maneuver is selected.

The automated transportation vehicle 1 is configured for discarding any command with the time of feasibility being below a predetermined threshold, exemplarily chosen as 3 s. Since the time of feasibility of the selected command exceeds this predetermined threshold (6 s>3 s), the method follows the path marked y in FIG. 4 and the ninth operation at 109 is executed by the automated transportation vehicle 1. The ninth operation at 109 consists of performing the selected command.

In another example, the validity information of the selected command relates to 2 s. The time of feasibility is now determined as below the predetermined threshold, which is why the method follows the path marked with n in FIG. 4 and starts again from the beginning.

REFERENCE LIST

1 Automated Transportation Vehicle
2 Control Center
3 Network
11 first Sensor
12 second Sensor

14

13 third Sensor
21 forth Sensor
22 fifth Sensor
23 sixth Sensor
30 Communication Module
31 Memory
32 Transceiver
40 Controller
41 Memory
42 CPU
50 Communication Unit
51 Memory
52 Transceiver
60 Control unit
61 Memory
62 CPU
101 first operation
102 second operation
103 third operation
104 forth operation
105 fifth operation
106 sixth operation
107 seventh operation
108 eighth operation
109 ninth operation
115 further operation
118 further operation
y yes
n no
L1 Uplink Latency
L2 Downlink Latency
M1 Request Message
M2 Message containing at least one Command and Validity Information
M3 third Message
M4 forth Message
S1 first Operation
S2 second Operation
S3 third Operation

The invention claimed is:
1. A method of a control center for operating an automated transportation vehicle, the method comprising:
receiving a request message comprising a request for driving assistance and information on a traffic scenario of the automated transportation vehicle;
determining at least one command for a maneuver of the automated transportation vehicle based on the traffic scenario and determining a validity information for the at least one command, wherein the at least one command and/or the validity information is determined based on a channel quality between the control center and the automated transportation vehicle, wherein the validity information is for a feasibility time of the at least one command, wherein the validity information for each command is determined as a difference of a time window of the maneuver of the command and a total of a duration of the maneuver and the latency, wherein the time window is based on the traffic scenario; and
transmitting the at least one command and the validity information to the automated transportation vehicle to enable selection and performance by the automated transportation vehicle on an automated basis in response to receipt of the transmission of the at least one command and the validity information transmitted by the control center.

2. The method of claim 1, wherein the channel quality relates to a latency of a transmission of the request message and/or to a latency of a transmission of the at least one command.

3. The method of claim 1, wherein the channel quality relates to at least one of an error bit rate (BER) a signal to interference plus noise ratio (SINR) and a predicted Quality of Service (PQOS).

4. The method of claim 1, wherein the channel quality is related to a specific area and/or time.

5. The method of claim 1, wherein the communication between the control center and the automated transportation vehicle is performed via a mobile communication network.

6. The method of claim 5, wherein channel quality information is received periodically or as a single notification from at least one server of the mobile communication network.

7. The method of claim 1, wherein the validity information for each command is determined as a difference of a time window for the maneuver of the command and a duration of the maneuver, wherein the time window is based on the traffic scenario.

8. The method of claim 1, wherein the validity information for the feasibility time specifies a time length in which the at least one command has to be executed by the auto- mated transportation vehicle and/or a time point until which the at least one command has to be executed by the auto- mated transportation vehicle.

9. The method of claim 7, wherein the determining of at least one command comprises:

determining a set of commands based on the traffic scenario and determining the duration of the maneuver of every command in the set of commands;

determining, for every maneuver, the time window based on the traffic scenario; and selecting the at least one command for which the validity information exceeds a predetermined threshold.

10. The method of claim 9, wherein selecting the at least one command further comprises selecting one of the at least one command that is providing the highest safety margin.

11. An automated transportation vehicle comprising:

at least one first sensor configured to acquire ambient data;

at least one second sensor configured to acquire vehicle data;

a communication module configured for communication with a control center; and a controller configured for:

determination of a traffic scenario based on data received by the at least one first sensor and by the at least one second sensor;

transmission of a request message comprising a request for driving assistance and information on the traffic scenario to the control center via the communication module;

receipt of at least one command and validity informa- tion for the at least one command from the control center via the communication module, wherein the at least one command and/or the validity information is based on a channel quality for communication between the control center and the automated trans- portation vehicle, wherein the validity information relates to a feasibility time of the at least one command, wherein the communication between the control center and the automated transportation vehicle is performed via a mobile communication network, wherein channel quality information is received periodically or as a single notification from at least one server of the mobile communication network, wherein the validity information for each command is determined as a difference of a time window of the maneuver of the command and a total of a duration of the maneuver and the latency, wherein the time window is based on the traffic scenario;

determination of a feasibility of the at least one com- mand based on the validity information;

selection of one of the at least one command based on the determined feasibility; and performance of the selected command on an automated basis in response to the command selection.

12. The automated transportation vehicle of claim 11, wherein the controller is further configured to determine a time of feasibility from the validity information and to select the one command with the largest feasibility time and/or for discarding any command with a feasibility time being below a predetermined threshold.

13. The automated transportation vehicle of claim 12, wherein the controller is further configured to determine a latency of the communication with the control center and to determine the feasibility time based on the validity infor- mation and the determined latency.

14. The automated transportation vehicle of claim 12, wherein the controller is further configured to send a new request message to the control center in response to the feasibility of each of the at least one command being insufficient.

15. The automated transportation vehicle of claim 11, wherein the channel quality relates to a latency of a trans- mission of the request message and/or to a latency of a transmission of the at least one command.

16. The automated transportation vehicle of claim 15, wherein the validity information for the feasibility time specifies a time length in which the at least one command has to be executed by the automated transportation vehicle and/or a time point until which the at least one command has to be executed by the automated transportation.

17. The automated transportation vehicle of claim 11, wherein the channel quality relates to at least one of an error bit rate (BER) a signal to interference plus noise ratio (SINR) and a predicted Quality of Service (PQOS).

18. The automated transportation vehicle of claim 11, wherein the channel quality is related to a specific area and/or time.

19. The automated transportation vehicle of claim 11, wherein the communication between the control center and the automated transportation vehicle is performed via a mobile communication network.

20. The automated transportation vehicle of claim 19, wherein channel quality information is received periodically or as a single notification from at least one server of the mobile communication network.

21. The automated transportation vehicle of claim 20, wherein the determination of the at least one command comprises:

determination of a set of commands based on the traffic scenario and determining the duration of the maneuver of every command in the set of commands;

determination, for every maneuver, of the time window based on the traffic scenario; and selection of the at least one command for which the validity information exceeds a predetermined thresh- old.

22. The automated transportation vehicle of claim 11, wherein the validity information for each command is determined as a difference of a time window for the maneuver of the command and a duration of the maneuver, wherein the time window is based on the traffic scenario.

23. The automated transportation vehicle of claim 22, wherein selection of the at least one command further comprises selection of one of the at least one command that is providing the highest safety margin.

\* \* \* \* \*